United States Patent [19]

Couture

[11] Patent Number: 5,575,110
[45] Date of Patent: Nov. 19, 1996

[54] SELF WATERING CHRISTMAS TREE STAND

[76] Inventor: Luc M. Couture, R.R. 1, Box 16C, Jefferson, N.H. 03583

[21] Appl. No.: 493,592

[22] Filed: Jun. 22, 1995

[51] Int. Cl.⁶ ........................................ A47G 7/02
[52] U.S. Cl. ............................................ 47/40.5
[58] Field of Search ............................... 47/40.5

[56] References Cited

U.S. PATENT DOCUMENTS

| | | | |
|---|---|---|---|
| 3,661,349 | 5/1972 | DeVries | 47/40.5 |
| 3,697,026 | 11/1972 | Hambrick | 248/524 |
| 4,850,137 | 7/1989 | Foster | 47/79 |
| 4,930,252 | 6/1990 | Krause et al. | 47/40.5 |
| 5,009,028 | 4/1991 | Lorenzana et al. | 47/40.5 |
| 5,016,389 | 5/1991 | Odom | 47/40.5 |
| 5,111,611 | 5/1992 | Elder | 47/40.5 |
| 5,157,868 | 10/1992 | Manoz | 47/40.5 |
| 5,201,140 | 4/1993 | Voorhis | 47/40.5 |

FOREIGN PATENT DOCUMENTS 672690  3/1939  Germany .................. 47/40.5

*Primary Examiner*—Henry E. Raduazo
*Attorney, Agent, or Firm*—Joseph H. McGlynn

[57] ABSTRACT

A self-watering tree stand having an external reservoir for holding a supply of water and a tube leading from the reservoir to a compartment in the tree stand. The compartment has a float valve for controlling the amount of water which is allowed to flow from the reservoir to the tree stand, and also, has a screen, the upper portion is made from a solid material and the lower portion is made from a screen type mesh which prevents debris and tree pitch from entering the compartment and interfering with the float valve.

10 Claims, 1 Drawing Sheet

SELF WATERING CHRISTMAS TREE STAND

BACKGROUND OF THE INVENTION

This invention relates in general to Christmas tree stands and in particular to a self-watering Christmas tree stand.

DESCRIPTION OF THE PRIOR ART

Conventional tree stands normally only hold a small amount of water. As a tree dries out inside a home it may require up to one and a half quarts of water a day. If the owner forgets to replenish the water, the tree dries out resulting in falling needles which is unsightly and a very serious fire hazard.

In the prior art tree stands with waterers have been developed, however, the self-watering devices, such as U.S. Pat. No. 4,930,252, feed water into the top of the stand, and, therefore, are unsightly. Because of their obtrusive presence, people tend not to use the self-waterers which presents a serious fire hazard.

SUMMARY OF THE INVENTION

The present invention utilizes a self-watering tree stand which feeds water into the tree stand from the bottom. This makes it easier to hide the unsightly reservoir and attached hose, and therefore, people will be more likely to use and obtain the benefits of the self-waterer.

It is an object of the invention to provide a self-watering Christmas tree stand which can be placed in a location that will make the reservoir unobtrusive.

It is an object of the invention to provide a self-watering Christmas tree stand which will supply water to a Christmas tree without the constant attention of the owner.

It is an object of the invention to provide a self-watering Christmas tree stand with a filter on the water inlet which will keep small debris from clogging the water inlet and float valve.

It is an object of the invention to provide a self-watering Christmas tree stand with a float valve to prevent over watering of the Christmas tree.

It is an object of the invention to provide a self-watering Christmas tree stand which is convenient to use.

These and other objects and advantages of the present invention will be fully apparent from the following description, when taken in connection with the annexed drawings.

DESCRIPTION OF THE PREFERRED EMBODIMENT

Figure 1:
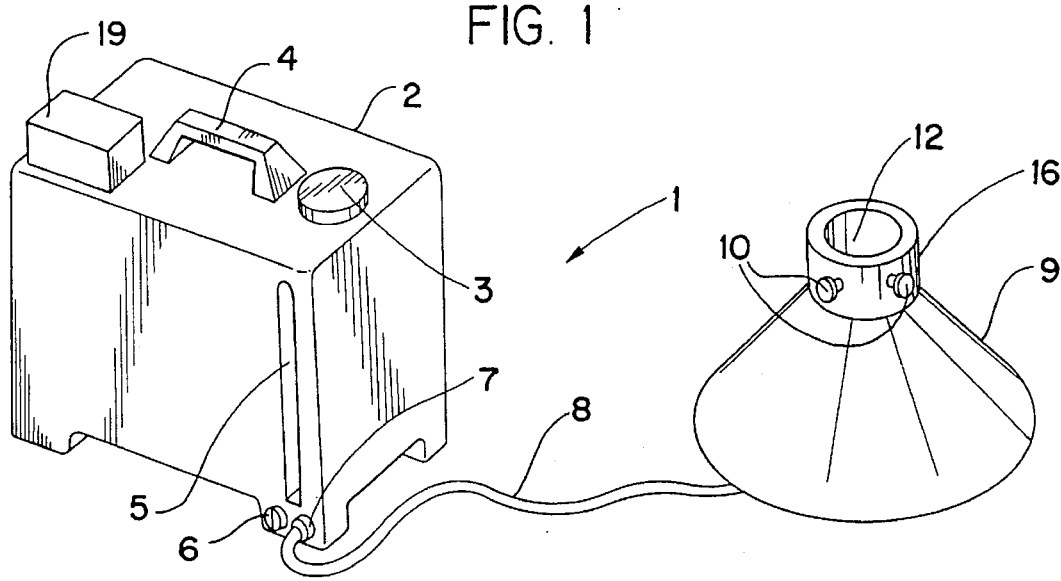
FIG. 1 is a perspective view of the tree stand and the attached reservoir.

Referring to the drawings, there is shown a a self-watering tree stand 1 in FIG. 1. The stand consists of a tapered platform 9 and a holding collar 16 which has a plurality of screws 10 which will secure the tree into the stand. The stand is made of plastic although other materials could be used. Connected to the stand is a water hose 8 one end of which is secured to a sealed compartment 15, shown in FIG. 3. The other end of the hose 8 is secured to a reservoir 2 by a conventional quick connect water hose connection 7. Although any type of hose connection may be used to secure the hose, a quick connector is preferred. Also, the size of the reservoir will vary depending on the size of the tree used in the stand, but generally it will hold between three to five gallons of water.

The water hose is a small, flexible rubber or plastic line approximately 12 to 15 feet long with a ¼ inch diameter. It should be noted that the above dimensions are merely examples and hoses that are longer or larger in diameter can be used without departing from the scope of the invention. The line should be long enough so the owner could easily place the reservoir 2 out of sight such as behind furniture or behind drapes.

Figure 2:
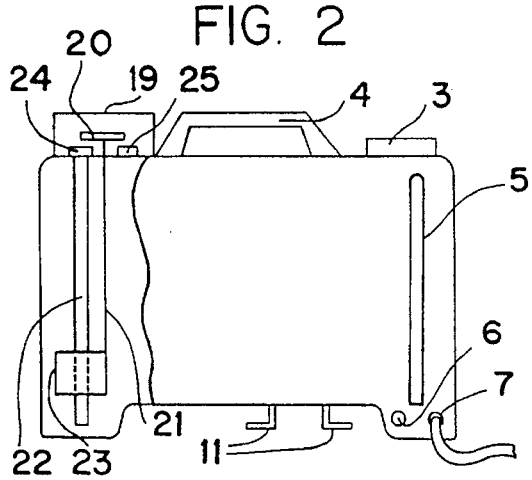
FIG. 2 is a side view of the reservoir.

Next to the hose connection 7 is a conventional water shut off valve 6 for the water hose. This valve will allow the water hose 8 to be disconnected at the hose connection 7 so the tank could be moved easily to a faucet for refilling. Also, above the shut off 6 is a sight glass 5 in the side of the reservoir. This will be made of glass or plastic so the amount of water left in the reservoir is easily discernible. The reservoir has a handle 4 on top so it can be easily moved in order to position it with respect to the tree, or to carry it to a faucet when the reservoir needs refilling. Also on top of the reservoir is a cap 3 which can be removed to allow refilling of the reservoir. The cap 3 could be screwed threaded or could be simply a friction fit with the reservoir. Beneath the reservoir, as shown in FIG. 2, is a hose rack 11. If there is excess hose after the reservoir is in position, the remaining hose can be wrapped around the hose rack 11 in order to maintain a neat appearance.

Figure 7:
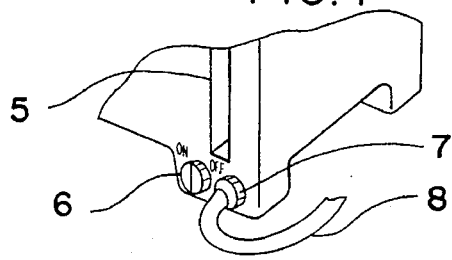
FIG. 7 is a schematic of the alarm.

Also, on top of the reservoir 2 is a housing 19 for the low water level alarm. As shown in a cut away view in FIG. 2, the alarm consists of a float 23 attached to a guide rod 22 preferably made of plastic. The float will rise or fall on the guide rod depending on the level of water in the reservoir. Attached to the float is a rod 21 with a electrical contact 20 mounted at the top of the rod 21. The rod 21 can be made of plastic but the contact 20 will be made of metal. Beneath the contact 20 is a pair of contacts 24 and 25 (see FIG. 7). The contact 24 is connected to one terminal on the bell or buzzer 27, and the other contact 25 is connected to one terminal of battery 26. The other terminal of battery 26 is connected to the other terminal on the bell or buzzer 27. When the water level in the reservoir becomes low, the float will drop and allow terminal 20 to engage terminals 24 and 25 which will complete the electric circuit and set off the alarm 27.

Figure 3:
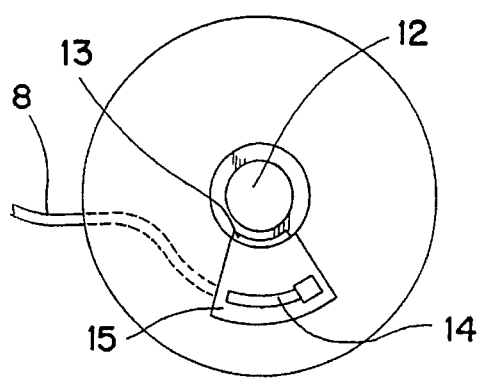
FIG. 3 is a top view of the tree stand.
Figure 4:
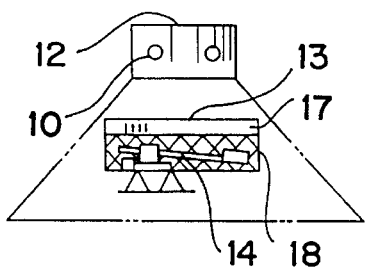
FIG. 4 is a cut away side view of the stand showing the float valve and the filter screen.

FIG. 3 shows a cut away view of the tree stand cut away to show the hose 8 connected to the compartment 15. The hose will enter either the side or the bottom of the compartment and will be sealed to prevent water leaking through the entrance. Any conventional way of sealing the hose in the compartment can be used. For example, a pipe could be embedded in the wall or the floor of the compartment 15 during the molding process that makes the stand, and the hose 8 could be secured to this pipe with a hose clamp.

Figure 5:
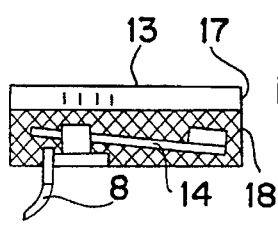
FIG. 5 is an enlarged view of the float valve and filter screen.
Figure 6:
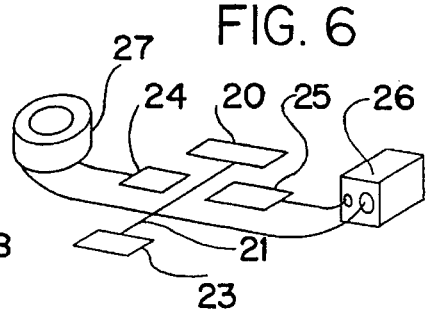
FIG. 6 is an enlarged view of a portion of the reservoir showing the sight glass, the shut off valve and the water hose connection.

As shown in FIG. 5, the hose can enter the compartment through the floor of the compartment underneath a float valve 14. The float valve will allow water to enter the compartment until it reaches a predetermined level. At this time the water will raise the right end of the float valve and at the same time lower the left end of the valve. The left end will be lowered until it contacts the water inlet and blocks it so no more water will enter the stand.

Directly behind the float valve is a filter screen 13. This screen will be positioned between the compartment 15 and the hole 12, which will hold the trunk of the tree. The screen should be removable so it can be cleaned and can be positioned in a recessed area between the the hole 12 and the compartment 15 by a friction fit. The screen 13 will prevent debris such as tree needles from entering the compartment 15 and interfering with the operation of the float valve. As shown in FIG. 5 the screen has a solid plastic upper portion 17 and a perforated, screen-type mesh, lower portion 18. The upper portion of the screen is solid because the pitch from an evergreen tree tends to float on water. The solid plastic upper portion will prevent floating pitch from entering the float valve area and interfering with the proper operation of the float valve.

Although the self-watering Christmas tree stand and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A self-watering tree stand comprising:

means for holding a tree in an upright position, compartment means connected to said means for holding a tree in an upright position, means for allowing water to flow from said compartment means to said means for holding a tree in an upright position, filter means positioned between said compartment means and said means for holding a tree in an upright position, said filter means having openings sized and shaped to pass water but not debris, valve means positioned in said compartment means for controlling the amount of water which flows into said compartment means, and means for supplying water to said compartment means.

2. The self-watering tree stand as claimed in claim 1, wherein said filter means is a close mesh screen which prevents debris from interfering with said valve means.

3. The self-watering tree stand as claimed in claim 1, wherein said means for supplying water to said compartment means is connected to a side of said compartment means.

4. The self-watering tree stand as claimed in claim 1, wherein said means for supplying water to said compartment means is connected to a bottom of said compartment means.

5. The self-watering tree stand as claimed in claim 1, wherein said means for supplying water to said compartment means comprises a reservoir and a flexible hose between said reservoir and said compartment means.

6. The self-watering tree stand as claimed in claim 5, wherein said reservoir contains a means for visually determining the level of water in said reservoir.

7. The self-watering tree stand as claimed in claim 5, wherein said reservoir contains a means for shutting off the flow of water from said reservoir.

8. The self-watering tree stand as claimed in claim 1, wherein said filter means has a top portion and a bottom portion, said bottom portion is a close mesh screen, and said top potion is a solid material, whereby said bottom portion will prevent debris from interfering with said valve means and said top portion will prevent tree pitch from interfering with said valve means.

9. A self-watering tree stand comprising:

means for holding a tree in an upright position, compartment means connected to said means for holding a tree in an upright position, means for allowing water to flow from said compartment means to said means for holding a tree in an upright position, filter means positioned between said compartment means and said means for holding a tree in an upright position, valve means positioned in said compartment means for controlling the amount of water which flows into said compartment means, and means for supplying water to said compartment means, and said filter means is a close mesh screen which prevents debris from interfering with said valve means.

10. A self-watering tree stand comprising:

means for holding a tree in an upright position, compartment means connected to said means for holding a tree in an upright position, means for allowing water to flow from said compartment means to said means for holding a tree in an upright position, filter means positioned between said compartment means and said means for holding a tree in an upright position, valve means positioned in said compartment means for controlling the amount of water which flows into said compartment means, and means for supplying water to said compartment means, and said filter means has a top portion and a bottom portion, said bottom portion is a close mesh screen, and said top potion is a solid material, whereby said bottom portion will prevent debris from interfering with said valve means and said top portion will prevent tree pitch from interfering with said valve means.

\* \* \* \* \*